United States Patent Office 2,786,777
Patented Mar. 26, 1957

2,786,777

SILICA COMPOSITION AND PRODUCTION THEREOF

Edward M. Allen, Wadsworth, Ohio, assignor to Columbia-Southern Chemical Corporation, Allegheny County, Pa., a corporation of Delaware No Drawing. Application May 18, 1953,
Serial No. 355,865

11 Claims. (Cl. 106—306)

This invention relates to a novel type of siliceous pigment which is suitable for use in various fields. According to the present invention, a new and useful pigment has been prepared by reaction of an alkaline earth metal silicate, notably calcium silicate, with aluminum sulfate.

This pigment is useful in the reinforcement of rubber, as a filler or pigment for paper compositions, and as a paint or an ink pigment. It also may be used as a loading or diluting agent in the compounding of insecticides such as benzene hexachloride or DDT.

In an application of Frank Waldo, Serial No. 558,084, filed October 10, 1944 (now abandoned), use of such a material in cosmetic powder is disclosed.

This novel pigment may be prepared effectively, according to this invention, by reaction of finely divided calcium silicate with aluminum sulfate in aqueous medium. This is an especially effective way of manufacturing this material. That is, when aluminum salts are commonly added to sodium silicate solutions, the product which is obtained upon drying the resulting precipitate usually is hard and glassy. In contrast, the product produced by reaction of aluminum sulfate with finely divided calcium silicate or like alkaline earth metal silicate is in the form of a light pulverulent powder which has an average particle size below 0.1 micron, usually as low as 0.02 to 0.05 micron. The resulting product also usually contains some quantity of water of hydration.

Two types of water normally are present, i. e., "free water" and "bound water." The term "free water," as used in this specification, denotes the water which may be removed from the pigment by heating the pigment at a temperature of 105° C. for a period of 24 hours. The term "bound water," as used herein, is intended to mean the amount of water which is driven off from the pigment herein contemplated by heating the pigment at ignition temperature, for example, 1000 to 1200° C., until no further water can be removed, minus the amount of free water in the pigment. Thus, it appears that the bound water is chemically bound to the pigment in some way not clearly understood. The free water, on the other hand, is readily removed and apparently is simply adsorbed on the pigment.

The free water concentration in the pigment normally ranges from about 2 to 10 percent by weight. The bound water which is present normally ranges between 2 to 10 percent by weight, more usually being in the range of about 1 mole per 2 moles of $SiO_2$.

Various types of calcium silicate may be reacted with aluminum sulfate in aqueous medium according to the present invention. Best results are obtained when precipitated calcium silicate is so treated. In such a case, this pigment should have an average particle size below 1 micron and, to obtain a pigment having the best properties, it is preferred to treat calcium silicate having an average ultimate particle size below about 0.1 micron as determined by the electron microscope.

The method of preparing the calcium silicate determines many of the properties thereof and, in like manner, determines properties of the pigment prepared according to this invention. Thus, it is advantageous to describe a method of preparing calcium silicate which has been found to be especially advantageous for use in connection with the present invention. Such calcium silicate may be prepared by reacting calcium chloride with alkali metal silicate in aqueous medium containing an initial amount of sodium chloride or like alkali metal chloride. This sodium chloride conveniently may be in the calcium chloride solution although it may also be in the sodium silicate solution. Thus, it has been found desirable to react aqueous sodium silicate with an aqueous calcium chloride solution containing sodium chloride preferably in the proportion of at least 0.1 pound, and usually in the range of 0.2 to 0.5 pound, of sodium chloride per pound of calcium chloride. Normally, the NaCl content of the solution is in excess of 2 to 5 grams per liter. However, solutions which contain higher sodium chloride content may be used. It is rare that the weight of sodium chloride will exceed the weight of calcium chloride in the solution or will be present in excess of 100 grams per liter in either solution.

For most purposes, calcium chloride solution containing in excess of 20 grams of $CaCl_2$ per liter, usually in the range of 50 to 150 grams per liter, and sodium silicate solution containing in excess of 20 grams of $SiO_2$ per liter, usually in the range of 50 to 150 grams per liter of $SiO_2$ are used. More concentrated solutions, containing up to about 200 grams per liter of $CaCl_2$ and of $SiO_2$ or even higher, may be used although best results have been obtained when the concentration of the $CaCl_2$ and $SiO_2$ solutions is below 200 grams per liter. More dilute solutions also may be used.

The proportion of calcium chloride solution to sodium silicate normally is sufficient to react with all or at least most of the sodium silicate. In general, the amount of calcium chloride is in stoichiometric excess. However, small excesses of sodium silicate are not objectionable. Thus, it is possible to use sodium silicate 10 to 25 percent in excess of the calcium chloride although best results are obtained when the calcium chloride is at least in stoichiometric amount. Excesses of sodium silicate as high as 100 percent over stoichiometric usually give unsatisfactory products. However, even such amounts may be used if the sodium chloride concentration is sufficiently high and the rate of acidification is held within the proper limits. Thus, the adverse effects of excess sodium silicate may be counteracted to an appreciable degree by the presence of sodium chloride in the reaction mixture subjected to acidification.

The precipitation of the calcium silicate in finely divided state, such as is herein required, may be accomplished by mixing a stream of aqueous sodium silicate solution with the calcium chloride solution under conditions which subject the mixture to a high degree of turbulence and almost instantaneous mixing. One effective way to produce the required turbulence is to introduce the two streams closely together into a central area of a centrifugal pump. In this case, the agitation of the mixture is effected as the introduced streams of the reactants are thrown radially outward by the pump rotor. In most cases, it is found desirable to limit the feed of the calcium chloride solution and alkaline metal silicate solutions to the pump to an amount below the capacity of the pump. For example, if the pump is capable of discharging 100 gallons per minute with unlimited flow of liquid to the pump, the amount of reacting solution supplied to the pump is held at least 10 percent below, and usually 35 percent or more below this amount. This appears to afford a greater degree of agitation of the reacting solutions and to ensure production of calcium silicate having the desired fineness.

To ensure production of the calcium silicate in a highly finely divided state, alkaline metal silicate having the composition $Na_2O(SiO_2)_x$, where $x$ is a number not less than 2 nor more than 4, is preferably used. This results in the production of a calcium silicate having the composition $CaO(SiO_2)_x$, where $x$ is as defined above. However, other calcium silicates, wherein $x$ is higher, may be used in certain cases.

Calcium silicate prepared according to the above described method has an average ultimate particle size of about 0.015 to 0.04 micron and a surface area of about 50 to 100 square meters per gram. Its composition is $CaO \cdot (SiO_2)_x$ where $x$ ranges from 2 to 4. This calcium silicate produces a fine, high quality product when used in performance of this invention. It should be understood, however, that other methods of preparing calcium silicate of equivalent quality may be used in the practice of this invention.

Following precipitation or other recovery of the calcium silicate, it is reacted with aluminum sulfate. If desired, the aluminum sulfate may be added to the precipitated slurry of calcium silicate either before or after removal of alkali metal salts from the slurry.

Alternatively, the calcium silicate may be separated from the aqueous slurry in which it has been formed and dried at a convenient temperature, for example, by heating at 100 to 150° C. Usually, such drying is conducted by heating at approximately 125° C. The dried pigment may then be reslurried in aqueous medium and reacted with aluminum sulfate.

The reaction may be conducted by adding aluminum sulfate, usually in aqueous solution, to a slurry of calcium silicate. In such a case the alkalinity of the pool of calcium silicate slurry gradually falls from a pH of about 10 to below 8.5, usually in the range of 6 to 8.5, depending upon the desired degree of completion of reaction. Further addition of aluminum sulfate solution causes an additional fall in pH. However, the reaction is essentially complete at pH 6.

According to a further method, the calcium silicate slurry may be added to a pool of aluminum sulfate solution. In this case the pH of the slurry rises from about 3, and again complete consumption of the aluminum sulfate is effected at about pH 6. Further addition produces a mixed slurry containing free calcium silicate which may react further, forming a calcium aluminum silicate. Addition of calcium silicate slurry is discontinued before the pH of the slurry rises above 8.5, usually in the range of 4 to 8.5.

According to a further embodiment, flowing streams of the aluminum sulfate solution and calcium silicate slurry may be mixed together, for example, in a centrifugal pump, while proportioning the reactants so that the slurry produced has a pH of about 4 to 8.5.

The resulting dried product is a fine, soft, freely-flowing powder which is relatively light in density. In general, it has a surface area of about 25 to 200 square meters per gram measured by the Brunauer-Emmett-Teller method which is described in Jour. Am. Chem. Soc., volume 60, page 309 (1938). Unless contaminated with coloring impurities, the product has unusual whiteness and has good hiding power.

It will be understood that a typical reaction between the aluminum sulfate and the calcium silicate occurs substantially in accordance with the following equation:

$$3CaO \cdot (SiO_2)_x + Al_2(SO_4)_3 \rightarrow Al_2O_3 \cdot 3CaO3SO_3 \cdot 3xSiO_2$$

From the above equation, it will be seen that one mole of aluminum sulfate reacts with 3 moles of calcium silicate. Where this stoichiometric proportion of aluminum sulfate to calcium silicate is used, all or substantially all of the calcium silicate is decomposed and only a minor amount of unreacted calcium silicate remains.

Since calcium sulfate has a substantial water solubility, an appreciable amount of the CaO and $SO_3$ content of the pigment usually is extracted on filtration or settling of the pigment. Thus, the CaO and $SO_3$ content of the completely reacted product usually is less than 3 moles per mole of $Al_2O_3$, although generally higher than about 0.5 mole per mole of $Al_2O_3$.

Where all of the calcium silicate is reacted, the subscript $x$ in the above formula is substantially 3. When only 50 percent of the calcium silicate is reacted, the subscript $x$ is 6.

Calcium silicate and like alkaline earth metal silicates are highly alkaline. A slurry of precipitated calcium silicate having the composition $CaO(SiO_2)_{3\cdot3}$ has a pH of about 10.5.

In many cases it is found desirable to effect precipitation or formation of the herein contemplated pigment in situ in a fibrous mixture. Thus, it is possible to produce a paper of high whiteness and brightness by adding to a slurry of paper fiber a quantity of aluminum sulfate and, after the aluminum sulfate solution has permeated the pores of the slurry, by simple mixing or conventional beating technique adding thereto a quantity of calcium silicate such as set forth above. The resulting mixture may be thoroughly mixed in a conventional beater to incorporate the co-precipitated pigment thoroughly and to effect a good bond between the surface of the fiber and the pigment.

This method of precipitation of the silica-calcium sulfate-alumina pigment herein contemplated in situ may be applied to various other materials, including cotton cloth and the like. The products which are obtained by this pigment have the whiteness and brightness of fibrous stocks in which titanium dioxide has been incorporated and are much cheaper to produce.

While in the preparation of paper compositions best results are obtained when the pigment herein contemplated is precipitated in situ, this is not absolutely necessary. Thus, the novel pigment herein described may be performed and then, before or after drying, incorporated with the fiber in a conventional pulp beater and the pigment thus beaten into the pulp and the pulp sheeted out into paper.

The novel pigment may also be used for numerous other purposes. For example, it may be incorporated in printing inks, paste powders, toothpaste, insecticidal compositions, and the like.

The products herein contemplated also are found to be very useful as rubber pigments, particularly for the reinforcement of rubber compositions including both natural rubber and synthetic rubber compositions, such as the butadiene-styrene copolymers known as "GR–S" rubber, chloroprene rubber, butyl rubber, and other like rubber-like polymers of butadiene-1,3, isoprene, piperylene, 2,3-dimethyl butadiene, and chlorobutadiene, including the homopolymers thereof and their copolymers with other organic monomeric ethylenic compounds, such as acrylonitrile, isobutylene, styrene, vinyl chloride, methyl methacrylate, and the like.

It will also be understood that mixtures of the pigment herein contemplated with other pigmentary materials may be produced. For example, calcium silicate may be partially reacted with an amount of hydrochloric acid (or like acid which forms a water soluble calcium salt) sufficient to react with 10 to 50 percent of the calcium silicate and thereby to form a mixture of silica and calcium silicate. This product may then be reacted with aluminum sulfate, forming a co-precipitated mixture of the silica with the pigment herein described. Likewise, other acids which form water soluble salts, such as nitric acid, acetic acid, nitrous acid, and the like, may be used for this purpose. The pigments also may be mixed with calcium carbonate, calcium sulfate, silica, and the like, without co-precipitation.

The following examples are illustrative:

EXAMPLE I

A water slurry containing 10 pounds of finely divided calcium silicate having an average ultimate particle size of about 0.05 micron as determined by the electron microscope, and having the composition $CaO \cdot (SiO_2)_{3.36}$, was thoroughly mixed with an aqueous solution containing 4.44 pounds of aluminum sulfate in an agitated tank.

After thorough mixing, the slurry was filtered and dried in a tray-type dryer at a temperature of 100–125° C. The resulting silicate product is a very fine white powder.

EXAMPLE II

An aqueous slurry containing 100 grams per liter of finely divided calcium silicate having the composition $CaO(SiO_2)_{3.3}$ was prepared by mixing continuously flowing streams of sodium silicate and calcium chloride, each containing 100 grams per liter of reactant, in a pump as described above. The resulting slurry was titrated with an aqueous solution containing 10 percent by weight of aluminum sulfate to a greenish yellow color using bromothymol blue as the indicator. The pH of such a slurry is about 7. During the titration, the temperature was maintained at 180° F. and the mixture was thoroughly agitated. Thereafter, the resulting product was filtered, washed with hot water, and dried at a temperature of about 100–125° C. The dry product was milled. The resulting product was found to be a fine, very white powder which, when dispersed in water, gave a slurry having a pH of about 5.7.

EXAMPLE III

The process of Example II was repeated except that the titration with aluminum sulfate was effected at 75° F. The resulting product, when dispersed in water, gave a slurry which had a pH of 7.

EXAMPLE IV

A pulp beater was charged as follows:

|  | Grams |
|---|---|
| Unbleached sulfite pulp | 90 |
| Bleached kraft pulp | 180 |
| Hard white envelope cuttings | 90 |

This charge was dispersed in 23 liters of water and the resulting slurry was beaten in a Niagara beater for about 80 minutes to approximately 400 milliliters freeness (Canadian Standard) (TAPPI Standard T227M50).

One hundred milliliters of prepared rosin size solution containing about 5 percent by weight of size was then added. Thereafter, 9 grams of pre-gelatinated starch was added and the pulp was circulated in the beater long enough to ensure complete mixing. Three percent by weight, based upon the weight of the pulp on a dry basis, of aluminum sulfate was added to samples of this pulp containing 18.8 grams of the pulp on a dry basis. At this stage the pulp consistency of each sample was approximately 1.1 percent. Stirring was continued for 2 minutes. Immediately thereafter, calcium silicate (prepared by the continuous process described above and dried at about 100–130° C.) having an average ultimate particle size of about 0.03 micron and the composition $CaO(SiO_2)_{3.3}$ and titanium dioxide in amounts indicated in the table were added. Stirring of the mixture was continued for 10 minutes more and the resulting stock was diluted to 8000 milliliters and sheeted into paper. These paper sheets were tested for reflectance and their opacity determined by contrast ratio. The results are as follows:

*Table I*

| Calcium Silicate (Grams) | TiO₂ (Grams) | Opacity or Contrast Ratio Contrast Ratio, Percent | | |
|---|---|---|---|---|
| | | Green Light | Blue Light | Average |
| ------ | 0.282 | 71.8 | 80.0 | 75.9 |
| 0.188 | 0.188 | 72.1 | 80.3 | 76.2 |
| 0.470 | 0.094 | 71.2 | 79.4 | 75.3 |
| ------ | 0.752 | 70.3 | 78.6 | 74.5 |
| ------ | ------ | 66.6 | 74.6 | 70.6 |

It was found that addition of about 4 percent by weight of the calcium silicate produced a product having brightness, bursting strength, and opacity comparable to 1.5 percent titanium dioxide. In view of the fact that the cost of calcium silicate is much lower than titanium dioxide, this represents a substantial saving.

EXAMPLE V

A slurry was prepared containing 5 grams of finely divided calcium silicate (prepared by the continuous method described above) having the composition $$CaO(SiO_2)_{3.3}$$

and dried at 100–130° C. to the point where it contained about 5 percent by weight of bound water and about 5 percent by weight of free water, in 95 grams of water. To this slurry were added portions of 0.5 molar aluminum sulfate solution and, after each addition, the slurry was agitated at room temperature for about 5 minutes. Thereupon, the pH of the slurry was measured. The results were as follows:

*Table II*

| Grams of Aluminum Sulfate $Al_2(SO_4)_3$ Added | pH of Resulting Slurry |
|---|---|
| 0.00 | 10.18 |
| 0.352 | 8.40 |
| 0.528 | 8.23 |
| 0.704 | 8.02 |
| 0.880 | 7.88 |
| 1.056 | 7.80 |
| 1.408 | 7.30 |
| 1.760 | 5.75 |
| 2.112 | 4.10 |
| 2.464 | 3.88 |
| 2.816 | 3.65 |
| 3.168 | 3.60 |
| 3.520 | 3.55 |
| 3.872 | 3.53 |
| 4.576 | 3.50 |
| 5.280 | 3.45 |
| 6.512 | 3.40 |

EXAMPLE VI

Four hundred grams of oven-dry sulfite paper pulp was mixed with 20 liters of water and the resulting mixture was beaten in a laboratory pulp beater for 10 minutes. Thereupon, 8 grams of dry rosin size was added and beating was continued until the pulp had a freeness of 175 cc. Ten minutes before the beating was completed, 16 grams of paper makers' alum was added. After the beating, 8 grams of calcium silicate having the CaO to SiO₂ ratio of about 1 to 3.3, an average particle size of 0.3 micron, and containing about 6 percent bound water and 6 percent free water was added and the mixture was circulated for 5 minutes. After this, the charge was removed from the beater. Two liters of the charge was diluted with a portion of the white water obtained by filtration of the remaining charge to a consistency necessary for paper making, and the pulp was settled to make paper. This paper was tested according to standard paper testing methods. The product thus obtained was found to have brightness and strength properties as good as those normally achieved using titanium dioxide, a more costly material, in lieu of calcium silicate.

The above description has been directed primarily to embodiments of the invention wherein the calcium silicate is prepared by continuous mixing of flowing streams of sodium silicate and calcium chloride, and the calcium silicate has the composition $CaO(SiO_2)_x$ where $x$ is about 2 to 4. Best results have been obtained using such calcium silicate. However, the calcium silicate of somewhat lower surface area produced by a batch process in which the sodium silicate is added to a pool of calcium chloride solution or vice versa also may be used. Moreover, other water insoluble white calcium silicates including mixed silicates of calcium and other metals may be used, particularly when the silicates have an average ultimate particle size below about 1 micron, preferably below 0.1 micron. Such silicates include calcium aluminum silicates, calcium sodium aluminum silicates, calcium potassium aluminum silicate, calcium zinc silicate, and like silicates in which the mole ratio of total $SiO_2$ to the total $CaO$ in the product is not substantially greater than about 10. A typical mixed silicate of this type which recently has become available has the following composition:

|  | Percent by weight |
|---|---|
| Ignition loss at 1000° C | 16.7 |
| Loss on drying at 105° C | 5.4 |
| $SiO_2$ | 46.1 |
| $R_2O_3$ (almost entirely $Al_2O_3$) | 10.88 |
| $Fe_2O_3$ | 0.24 |
| $CaO$ | 11.82 |
| $MgO$ | 0.38 |
| $Na_2O$ | 10.04 |
| Chloride | 0.04 |
| $SO_3$ | 3.8 |
| $CO_2$ | 6.6 |

Some portion of the CaO content of this product appears to be present as calcium carbonate.

While the above processes have been described in connection with calcium silicate, other corresponding water insoluble alkaline earth metal silicates including barium silicate, magnesium silicate, strontium silicate, etc., may be used in lieu of calcium silicate. Moreover, zinc silicate and like silicates of metals of series 3 to 8 of group II of the periodic table which contain an amount of the oxide of such metal molecularly equivalent to the above stated amounts of CaO may be used. In such a case, the product obtained has the composition:

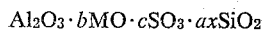

$$Al_2O_3 \cdot bMO \cdot cSO_3 \cdot axSiO_2$$

Although the present invention has been described with particular reference to the specific details of certain embodiments thereof, it is not intended that such details shall be regarded as limitations upon the scope of the invention except insofar as included in the accompanying claims.

This application is a continuation-in-part of my copending application Serial No. 770,169, filed August 22, 1947.

What is claimed:

1. A method which comprises reacting aluminum sulphate in aqueous medium with finely divided calcium silicate having an average ultimate particle size of 0.015 to 1 micron and having the composition $CaO(SiO_2)_x$ where $x$ is a number not less than 2 nor more than 4, the amount of said aluminum sulphate being at least enough to decompose at least 50 percent of said calcium silicate, and thereby to cause precipitation of $Al_2O_3$ and production of a precipitate comprising $Al_2O_3$ and $SiO_2$ having a pH in the range of from 4 to 8.5 in an aqueous medium.

2. A method which comprises reacting aluminum sulphate in aqueous medium with finely divided calcium silicate having an average ultimate particle size of 0.015 to 1 micron and having the composition $CaO(SiO_2)_x$, where $x$ is a number not less than 2 nor more than 10, the amount of said aluminum sulphate being at least enough to decompose at least 50 percent of said calcium silicate, and thereby to cause precipitation of $Al_2O_3$ and production of a precipitate comprising $Al_2O_3$ and $SiO_2$ having a pH in the range of from 4 to 8.5 in an aqueous medium.

3. A method which comprises reacting aluminum sulphate in aqueous medium with finely divided alkaline earth metal silicate having an average ultimate particle size of 0.015 to 1 micron and having the composition $MO(SiO_2)_x$, where $x$ is a number not less than 2 nor more than 4 and M is an alkaline earth metal, the amount of said aluminum sulphate being at least enough to decompose at least 50 percent of said alkaline earth metal silicate, and thereby to cause precipitation of $Al_2O_3$ and production of a precipitate comprising $Al_2O_3$ and $SiO_2$ having a pH in the range of from 4 to 8.5 in an aqueous medium.

4. A method which comprises reacting aluminum sulphate in aqueous medium with finely divided alkaline earth metal silicate having an average ultimate particle size of 0.015 to 1 micron and having the composition $MO(SiO_2)_x$, where $x$ is a number not less than 2 nor more than 10 and M is an alkaline earth metal, the amount of said aluminum sulphate being at least enough to decompose at least 50 percent of said alkaline earth metal silicate, and thereby to cause precipitation of $Al_2O_3$ and production of a precipitate comprising $Al_2O_3$ and $SiO_2$ having a pH in the range of from 4 to 8.5 in an aqueous medium.

5. A method which comprises reacting aluminum sulphate with finely divided calcium silicate in aqueous slurry, said calcium silicate having an average ultimate particle size of 0.015 to 1 micron, the amount of said aluminum sulphate being at least sufficient to decompose at least 50 percent of the calcium silicate and thereby to cause precipitation of $Al_2O_3$ and production of a precipitate comprising $Al_2O_3$ and $SiO_2$ having a pH below 8.5.

6. A method which comprises reacting aluminum sulphate with a finely divided alkaline earth metal silicate, in aqueous medium, said alkaline earth metal silicate having an average ultimate particle size of 0.015 to 1 micron, the amount of said aluminum sulphate being at least sufficient to decompose at least 50 percent of the alkaline earth metal silicate and thereby to cause precipitation of $Al_2O_3$ and production of a precipitate comprising $Al_2O_3$ and $SiO_2$.

7. A method which comprises reacting aluminum sulphate with finely divided calcium silicate having an average ultimate particle size of 0.015 to 1 micron, in aqueous medium, the amount of said aluminum sulphate being at least sufficient to decompose at least 50 percent of the calcium silicate and thereby to cause precipitation of $Al_2O_3$ and to form an alumina-silica pigment and calcium sulphate, and washing at least a portion of the calcium sulphate from the resulting alumina-silica pigment.

8. A method which comprises reacting aluminum sulphate with a finely divided alkaline earth metal silicate having an average ultimate particle size of 0.015 to 1 micron, in aqueous medium, the amount of said aluminum sulphate being at least one mole of aluminum sulphate per 6 moles of alkaline earth metal silicate and thereby to cause precipitation of $Al_2O_3$ and to produce an alumina-silica pigment and an alkaline earth metal sulphate, and washing from the alumina-silica pigment at least a portion of the evolved alkaline earth metal sulphate.

9. A method which comprises reacting in aqueous medium aluminum sulphate with calcium silicate having an average ultimate particle size of 0.015 to 1 micron, the amount of said aluminum sulphate being at least one mole per 6 moles of CaO in said calcium silicate and thereby to cause precipitation of $Al_2O_3$ and production of a precipitate comprising $Al_2O_3$ and $SiO_2$.

10. A method which comprises reacting in aqueous medium aluminum sulphate with calcium silicate having an average ultimate particle size of 0.015 to 1 micron, in aqueous medium, the amount of said aluminum sulphate being sufficient to substantially completely decompose said calcium silicate and thereby to cause precipitation of $Al_2O_3$ and to cause precipitation of a precipitate comprising $Al_2O_3$ and $SiO_2$.

11. The process which comprises reacting in an aqueous medium aluminum sulphate with alkaline earth metal silicate having an average ultimate particle size of 0.015 to 1 micron, the amount of said aluminum sulphate being sufficient to reduce the pH of the resulting slurry to a pH not substantially in excess of 7.

References Cited in the file of this patent

UNITED STATES PATENTS

| | | |
|---|---|---|
| 1,017,912 | Rhodin | Feb. 20, 1912 |
| 1,920,340 | Bailey et al. | Aug. 1, 1933 |
| 2,314,188 | Allen | Mar. 16, 1943 |
| 2,679,463 | Alexander et al. | May 25, 1954 |
| 2,686,731 | Wainer | Aug. 17, 1954 |